(12) United States Patent
Tsukagoshi

(10) Patent No.: US 10,951,910 B2
(45) Date of Patent: *Mar. 16, 2021

(54) TRANSMISSION DEVICE, TRANSMITTING METHOD, RECEPTION DEVICE, AND RECEIVING METHOD

(71) Applicant: Saturn Licensing LLC, New York, NY (US)

(72) Inventor: Ikuo Tsukagoshi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/543,255

(22) Filed: Aug. 16, 2019

(65) Prior Publication Data

US 2019/0373277 A1    Dec. 5, 2019

Related U.S. Application Data

(63) Continuation of application No. 14/417,215, filed as application No. PCT/JP2013/073576 on Sep. 2, 2013, now Pat. No. 10,432,957.

(30) Foreign Application Priority Data

Sep. 7, 2012    (JP) .................................. 2012-197922

(51) Int. Cl.
*H04N 19/46*      (2014.01)
*H04N 19/587*    (2014.01)
(Continued)

(52) U.S. Cl.
CPC ........... *H04N 19/46* (2014.11); *H04N 19/587* (2014.11); *H04N 19/59* (2014.11); *H04N 19/70* (2014.11);
(Continued)

(58) Field of Classification Search
CPC ...... G04N 19/46; G04N 19/587; G04N 19/59; G04N 19/70; G04N 19/85; G04N 21/25825; G04N 21/440263
See application file for complete search history.

(56) References Cited

U.S. PATENT DOCUMENTS 7,136,417 B2 * 11/2006 Rodriguez ............... H04N 5/76
375/240.29
8,855,195 B1  10/2014 Kelly
(Continued)

FOREIGN PATENT DOCUMENTS

CN    1926607    3/2007
CN    102132568    7/2011
(Continued)

OTHER PUBLICATIONS

Efficient coding scheme for super high definition video based on extending H.264 high profile; Naito et al.;2006; Jan. 19, 2006; retrieved from the internet May 20, 2020.*
(Continued)

*Primary Examiner* — Jonathan R Messmore
(74) *Attorney, Agent, or Firm* — Oblon, McClelland, Maier & Neustadt, L.L.P.

(57) ABSTRACT

In the case where image data of a super-high definition service is transmitted without scalable coding, image data suitable to own display capability in a receiver not supporting the super-high definition service can be easily obtained. A container in a predetermined format having a video stream including encoded image data is transmitted. Auxiliary information for downscaling a spatial and/or temporal resolution of the image data is inserted into the video stream. For example, the auxiliary information indicates a limit of accuracy for a motion vector included in the encoded image data. Further, for example, the auxiliary information iden-
(Continued)

Semantics definition of picture_temporal_pickup

```
half picture rate flag (1bit)
    1      current picture is decoded by the desired decoder
           which can display the half picture rate
    0      current picture is not decoded by the desired decoder
           which can display the half picture rate quarter picture rate flag (1bit)
    1      current picture is decoded by the desired decoder
           which can display the quarter picture rate
    0      current picture is not decoded by the desired decoder
           which can display the quarter picture rate
``` tifies a picture to be selected at the time of downscaling the temporal resolution at a predetermined ratio.

24 Claims, 19 Drawing Sheets

(51) Int. Cl.
*H04N 19/59* (2014.01)
*H04N 19/70* (2014.01)
*H04N 21/258* (2011.01)
*H04N 21/4402* (2011.01)
*H04N 19/85* (2014.01)

(52) U.S. Cl.
CPC ....... *H04N 19/85* (2014.11); *H04N 21/25825* (2013.01); *H04N 21/440263* (2013.01); *H04N 21/440281* (2013.01)

(56) References Cited

U.S. PATENT DOCUMENTS

| | | | |
|---|---|---|---|
| 2005/0053295 A1 | 3/2005 | Holcomb | |
| 2005/0058205 A1 | 3/2005 | Holcomb | |
| 2006/0140224 A1 | 6/2006 | Yoshida | |
| 2006/0274204 A1* | 12/2006 | Kimura | H04N 19/85 348/558 |
| 2008/0278567 A1 | 11/2008 | Nakajima | |
| 2008/0310513 A1* | 12/2008 | Ma | H04N 19/513 375/240.16 |
| 2009/0034627 A1 | 2/2009 | Rodriguez | |
| 2010/0218232 A1* | 8/2010 | Rodriguez | H04N 21/8451 725/118 |
| 2011/0122952 A1 | 5/2011 | Esaki | |
| 2011/0273532 A1 | 11/2011 | Kitazato | |
| 2012/0033039 A1 | 2/2012 | Sasaki et al. | |
| 2012/0075421 A1* | 3/2012 | Tsukagoshi | H04N 13/178 348/43 |
| 2013/0287090 A1 | 10/2013 | Sasaki | |
| 2014/0115472 A1 | 4/2014 | Mochinaga | |

FOREIGN PATENT DOCUMENTS

| | | |
|---|---|---|
| CN | 102318202 | 1/2012 |
| CN | 102450010 | 5/2012 |
| EP | 2 426 922 A1 | 3/2012 |
| JP | 2005-130313 A | 5/2005 |
| JP | 2011-057069 A | 3/2011 |
| JP | 2012-060575 A | 3/2012 |
| JP | 2015-530025 A | 10/2015 |
| KR | 10-2009-0037920 A | 4/2009 |
| KR | 10-2010-0018474 A | 2/2010 |
| RU | 2 389 140 C2 | 5/2010 |
| WO | WO 2009/104850 A1 | 8/2009 |
| WO | WO 2012/017643 A1 | 2/2012 |
| WO | WO 2012/111320 | 8/2012 |
| WO | WO 2014/025213 A1 | 2/2014 |

OTHER PUBLICATIONS

International Search Report dated Nov. 26, 2013 in PCT/JP2013/073576.
"Operational Guidelines for Digital Terrestrial Television Broadcasting, ARIB Technical Report, ARIB TR-B14" Association of Radio Industries and Businesses, 4.9 Edition vol. 1, Jul. 3, 2012, 9 Pages and cover page (with English language translation).
Extended European Search Report dated Feb. 26, 2016 in Patent Application No. 13834928.7.
"H.264/MPEG-4 AVC" Wikipedia, XP055249926, Aug. 29, 2012, pp. 1-10.
Toshiyasu Sugio, et al., "Picture Adaptive 1/8-pel Motion Compensation Method" Joint Collaborative Team on Video Coding of ISO/IEC JTC1/SC29/WG11and ITU-T SG.16, 6th Meeting, XP030009494, Jul. 1, 2011, pp. 1-13.
"The H.264 Advanced Video Compression Standard" Chapter 10, Extensions and Directions, Second Edition, XP030001641, Apr. 20, 2010, pp. 288-311 and Introduction page.
"Text of ISO/IEC 14496-10:201X ($7^{th}$ Edition)" International Standard, Motion Picture Expert Group or ISO/IEC JTC1/SC29/WG11, XP030018858, Feb. 2, 2012, pp. 1-699 and cover pages.
Office Action dated Aug. 30, 2016 in Japanese Patent Application No. 2016-154550 (with English translation).
Office Action dated Aug. 30, 2016 in Japanese Patent Application No. 2016-154798 (with English translation).
Office Action dated Aug. 30, 2016 in Japanese Patent Application No. 2016-154962 (with English translation).
Combined Russian Office Action and Search Report dated Dec. 19, 2016 in Russian Patent Application No. 2015107001 (with partial English language translation and English translation of categories of cited documents).
Office Action dated Jul. 25, 2017 in Chinese Patent Application No. 201380044781.8 (with English translation).

* cited by examiner

FIG. 1
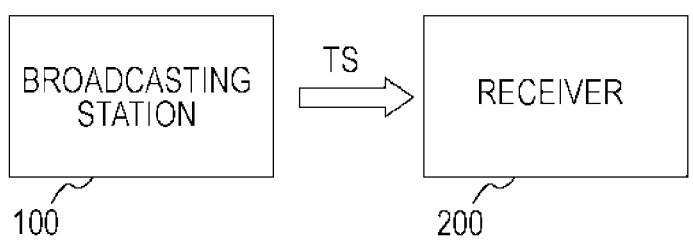
FIG. 2
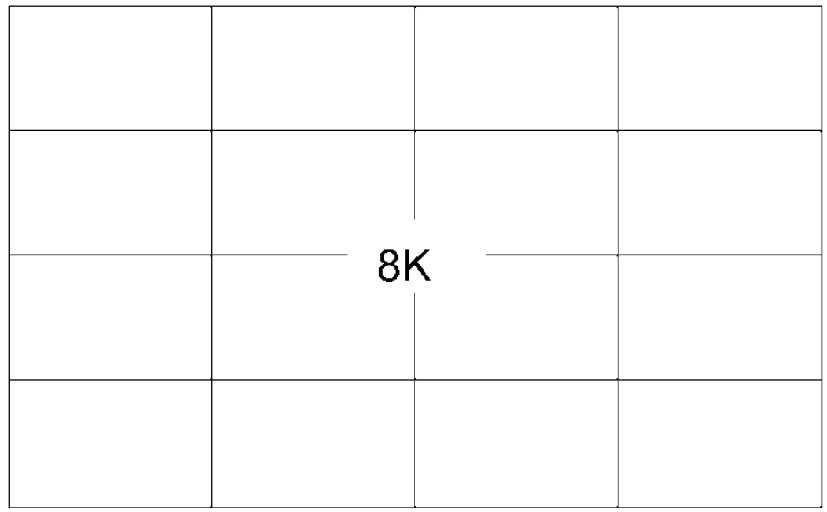
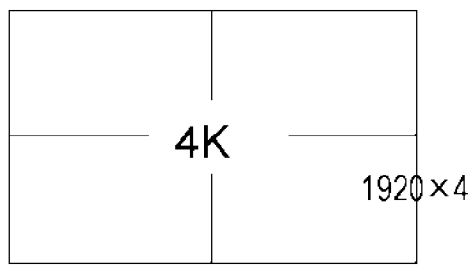
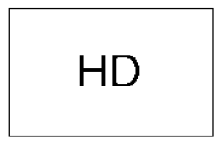

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) { | | |
| user_data_payload_byte | 8 | bslbf |
| } | | |
| } | | |

(b)

| Syntax | No. of Bits | Format |
|---|---|---|
| userdata_for_downscaling_spatial ( ) { | | |
| userdata_id | 16 | uimslbf |
| downscaling_spatial_length | 8 | bslbf |
| constrained_to_half_pixel_MV_flag | 1 | bslbf |
| constrained_to_integer_pixel_MV_flag | 1 | bslbf |
| reserved | 6 | 0x3f |
| } | | |

*FIG. 11*

Semantics definition of downscaling_spatial

| | |
|---|---|
| constrained_to_half_pixel_MV_flag    (1bit) | |
| 1 | Motion vector precision is restricted to half pixel |
| 0 | No restriction to Motion vector |
| | |
| constrained_to_integer_pixel_MV_flag    (1bit) | |
| 1 | Motion vector precision is restricted to integer pixel |
| 0 | No restriction to Motion vector |

| Syntax | No. of Bits | Format |
|---|---|---|
| user_data_unregistered (size) { | | |
| uuid_iso_iec_11578 | 128 | uimsbf |
| for( i = 16; i < payloadSize; i++ ) { | | |
| user_data_payload_byte | 8 | bslbf |
| } | | |
| } | | |

(b)

| Syntax | No. of Bits | Format |
|---|---|---|
| userdata_for_picture_temporal( ) { | | |
| userdata_id | 16 | uimsbf |
| picture_temporal_pickup_length | 8 | bslbf |
| half picture rate flag | 1 | bslbf |
| quarter picture rate flag | 1 | bslbf |
| reserved | 6 | 0x3f |
| } | | |

*FIG. 13*

Semantics definition of picture_temporal_pickup

| half picture rate flag (1bit) | |
|---|---|
| 1 | current picture is decoded by the desired decoder which can display the half picture rate |
| 0 | current picture is not decoded by the desired decoder which can display the half picture rate |
| quarter picture rate flag (1bit) | |
| 1 | current picture is decoded by the desired decoder which can display the quarter picture rate |
| 0 | current picture is not decoded by the desired decoder which can display the quarter picture rate |

FIG. 14

| Syntax | No. of Bits | Format |
|---|---|---|
| downscaling_descriptor() { | | |
|   downscaling_descriptor_tag | 8 | uimsbf |
|   downscaling_descriptor_length | 8 | uimsbf |
|   reserved | 2 | 0x3 |
|   downscaling_type | 2 | bslbf |
|   if(downscaling_type == 01) { | | |
|     temporal_downscaling_factor | 2 | bslbf |
|     reserved | 2 | 0x3 |
|   } | | |
|   else if(downscaling_type == 10) { | | |
|     reserved | 2 | 0x3 |
|     spatial_downscaling_factor | 2 | bslbf |
|   } | | |
|   else if(downscaling_type == 11) { | | |
|     temporal_downscaling_factor | 2 | bslbf |
|     spatial_downscaling_factor | 2 | bslbf |
|   } | | |
|   else() { | | |
|     reserved | 4 | 0xf |
|   } | | |
| } | | |

FIG. 15

| Syntax | No. of Bits | Format |
|---|---|---|
| downscaling_descriptor() { | | |
|   downscaling_descriptor_tag | 8 | uimsbf |
|   downscaling_descriptor_length | 8 | uimsbf |
|   reserved | 2 | 0x3 |
|   spatial resolution class type | 3 | bslbf |
|   temporal resolution class type | 3 | bslbf |
|   reserved | 2 | 0x3 |
|   downscaling_type | 2 | bslbf |
|   if(downscaling_type == 01) { | | |
|     temporal_downscaling_factor | 2 | bslbf |
|     reserved | 2 | 0x3 |
|   } | | |
|   else if(downscaling_type == 10) { | | |
|     reserved | 2 | 0x3 |
|     spatial_downscaling_factor | 2 | bslbf |
|   } | | |
|   else if(downscaling_type == 11) { | | |
|     temporal_downscaling_factor | 2 | bslbf |
|     spatial_downscaling_factor | 2 | bslbf |
|   } | | |
|   else() { | | |
|     reserved | 4 | 0xf |
|   } | | |
| } | | |

FIG. 16

Semantics definition of downscaling_descriptor()

downscaling_type (2bits)
    00        reserved
    01        temporal_downscaling
    10        spatial_downscaling
    11        both temporal and spatial_downscaling temporal_downscaling_factor (2bits) INDICATE TEMPORAL-DIRECTION DOWNSCALE (MAXIMUM PERFORMANCE)
    00        ratio 1 (no downscaling)
    01        ratio ½ (half)
    10        ratio ¼ (quarter)
    11        reserved spatial_downscaling_factor (2bits) INDICATE SPATIAL-DIRECTION DOWNSCALE (MAXIMUM PERFORMANCE)
    00        ratio 1 (no downscaling)
    01        ratio ½ (half in both horizontal and vertical)
    10        ratio ¼ (quarter in both horizontal and vertical)
    11        reserved Spatial resolution class type (3bits)
    000       reserved
    001       1920 x 1080
    010       3840 x 2160
    011       7680 x 4320
    1xx       reserved Temporal resolution class type (3bits)
    000       reserved
    001       24Hz, 25Hz, 29.97Hz, 30Hz
    010       50Hz, 59.94Hz, 60Hz
    011       100Hz, 120Hz
    100       200Hz, 240Hz
    others    reserved

FIG. 17

Syntax of Super High Resolution descriptor

| Syntax | No. of Bits | Format |
|---|---|---|
| Super High Resolution descriptor() { | | |
| Super High Resolution_tag | 8 | uimslbf |
| Super High Resolution_length | 8 | uimslbf |
| Spatial resolution class type | 3 | bslbf |
| Temporal resolution class type | 3 | bslbf |
| Backward_compatible_type | 2 | bslbf |
| lower_capable_decoder_support_flag | 1 | bslbf |
| reserved | 7 | 0x7f |
| } | | |

FIG. 18

Semantics definition of Super High Resolution descriptor

```
Spatial resolution class type   (3bits)
        000             reserved
        001             1920 x 1080
        010             3840 x 2160
        011             7680 x 4320
        1xx             reserved Temporal resolution class type  (3bits)
        000             reserved
        001             24Hz, 25Hz, 29.97Hz, 30Hz
        010             50Hz, 59.94Hz, 60Hz
        011             100Hz, 120Hz
        100             200Hz, 240Hz
        others          reserved Backward_compatible_type  (2bits)
        00              non-compatible
        01              spatially backward compatible
        10              temporally backward compatible
        11              reserved
lower_capable_decoder_support_flag    (1bit)
        1               the encoded stream has a support
                        for lower capable decoder
        0               no support for lower capable decoder
```

TRANSMISSION DEVICE, TRANSMITTING METHOD, RECEPTION DEVICE, AND RECEIVING METHOD

CROSS REFERENCE TO RELATED APPLICATIONS

This application is a continuation of U.S. application Ser. No. 14/417,215, filed on Jan. 26, 2015, and is based upon and claims the benefit of priority to International Application No. PCT/JP2013/073576, filed on Sep. 2, 2013, and JP 2012-197922, filed on Sep. 7, 2012. The entire contents of each of these documents are incorporated herein by reference.

TECHNICAL FIELD

The present technique relates to a transmission device, a transmitting method, a reception device, and a receiving method, particularly to the transmission device and the like which transmit image data of a spatial or temporal super-high-resolution image.

BACKGROUND ART

For example, in addition to a service for an HD image having valid pixels of 1920×1080, a service for a spatial super-high-resolution image such as 4K and 8K images respectively having two times and four times the valid pixels in horizontal and vertical directions (see Patent Document 1, for example) is proposed. Further, for example, in addition to a service for an image having a frame frequency of 30 Hz, a service for a temporal super-high-resolution image having a frame frequency such as 60 Hz and 120 Hz is proposed. Note that these services for the super-high-resolution images will be suitably referred to as super-high definition service.

CITATION LIST

Patent Document

Patent Document 1: Japanese Patent Application Laid-Open No. 2011-057069

SUMMARY OF THE INVENTION

Problems to be Solved by the Invention

In the case where scalable coding is applied to image data of the above-described super-high definition service, image data having a resolution suitable to own display capability can be easily obtained even in a receiver not supporting the super-high definition service. However, in the case where scalable coding is not applied to the image data of the super-high definition service, the image data having the resolution suitable to own display capability can be hardly obtained in the receiver not supporting the super-high definition service.

An object of the present technique is to facilitate obtainment of image data having a resolution suitable to own display capability in a receiver not supporting a super-high definition service in the case where image data of the super-high definition service is transmitted without scalable coding.

Solutions to Problems

According to an aspect of the present technique, a transmission device includes: a transmission unit configured to transmit a container in a predetermined format having a video stream including encoded image data; and an auxiliary information inserting unit configured to insert, into the video stream, auxiliary information for downscaling a spatial and/or temporal resolution of the image data.

According to the present technique, the container in the predetermined format having the video stream including the encoded image data is transmitted by the transmission unit. The encoded image data is, for example, the image data applied with encoding such as MPEG4-AVC(MVC), MPEG2 video, or HEVC. The container may be, for example, a transport stream (MPEG-2 TS) adopted in the digital broadcast standard. Further, the container may be, for example, the container in the MP4 format used in the Internet delivery or other formats.

The auxiliary information for downscaling the spatial and/or temporal resolution of the image data is inserted into the video stream by the auxiliary information inserting unit. For example, the auxiliary information may indicate a limit of accuracy for a motion vector included in the encoded image data. Also, for example, the auxiliary information may identify a picture to be selected at the time of downscaling a temporal resolution at a predetermined ratio.

Thus, according to the present technique, the auxiliary information for downscaling the spatial and/or temporal resolution of the image data is inserted into video stream. Therefore, in the case where the image data of the super-high definition service is transmitted without scalable coding, image data having a resolution suitable to own display capability can be easily obtained in a receiver not supporting the super-high definition service Meanwhile, according to the present technique, for example, an identifying information inserting unit configured to insert, into a layer of the container, identifying information indicating that the auxiliary information is inserted into the video stream may be further provided. In this case, the receiver can grasp that the auxiliary information is inserted into the video stream even without decoding the video stream, and the auxiliary information can be extracted appropriately.

For example, the identifying information may be added with downscaling information indicating an available ratio in downscaling the spatial and/or temporal resolution. Further, the identifying information may be added with spatial and/or temporal resolution information of the image data included in the video stream. Moreover, the container is a transport stream, for example, and the identifying information inserting unit may be configured to insert the identifying information into descriptor under a video elementary loop of a program map table included in the transport stream.

Furthermore, according to the present technique, for example, a resolution information inserting unit configured to insert, into a layer of the container, spatial and/or temporal resolution information of the image data included in the video stream may be further provided. In this case, contents of the downscaling processing can be determined based on the resolution information in the receiver not supporting the super-high definition service in the case were the image data of the super-high definition service is transmitted without scalable coding.

For example, the resolution information may be added with identifying information identifying whether the video stream is provided with support for a low performance decoder not supporting the spatial and/or temporal resolution of the image data. Further, the container is a transport stream, for example, and the resolution information inserting unit may be configured to insert the resolution information into descriptor under an event information table included in the transport stream.

Additionally, according to still another aspect of the present technique, a transmission device includes: a transmission unit configured to transmit a container in a predetermined format having a video stream including encoded image data; and an identifying information inserting unit configured to insert, into a layer of the container, identifying information such that a super-high definition service by the video stream can be identified at least per program basis.

According to the present technique, the container in the predetermined format having the video stream including the image data is transmitted by the transmission unit. The container may be, for example, a transport stream (MPEG-2 TS) adopted in the digital broadcast standard. Further, the container may be, for example, the container in the MP4 format used in the Internet delivery or other formats.

The identifying information is inserted into the layer of the container by the identifying information inserting unit such that the super-high definition service by the video stream can be identified at least per program basis. For example, the identifying information may be added with the spatial and/or temporal resolution information of the image data. The container is, for example, a transport stream, and the identifying information inserting unit may be configured to insert the identifying information into the descriptor under the event information table included in the transport stream.

Thus, according to the present technique, the identifying information is inserted into the layer of the container such that the super-high definition service by the video stream can be identified at least per program basis. Therefore, the receiver can easily identify the super-high definition service, and properly and instantly determine whether downscaling processing of the spatial and/or temporal resolution is needed and also a ratio thereof by making comparison with the own display capability.

Meanwhile, according to the present technique, the identifying information may be added with, for example, support information indicating whether the video stream is provided with support for a low performance decoder not supporting the spatial and/or temporal resolution of the image data. In this case, the receiver can easily determine whether the video stream is provided with the support for the low performance decoder, more specifically, determine whether the auxiliary information for downscaling the spatial and/or temporal resolution is inserted or the like.

Further, according to still another aspect of the present technique, a reception device includes: a receiving unit configured to receive a video stream including encoded image data; and a processing unit configured to apply downscaling processing of a spatial and/or temporal resolution to the encoded image data based on auxiliary information for downscaling the spatial and/or temporal resolution of the image data, and obtain display image data having a desired resolution, wherein the auxiliary information is inserted into the video stream.

According to the present technique, the video stream including the encoded image data is received by the receiving unit. The auxiliary information for downscaling the spatial and/or temporal resolution of the image data is inserted into the video stream. Further, the downscaling processing of the spatial and/or temporal resolution is applied to the encoded image data by the processing unit based on the auxiliary information, and the display image data having the desired resolution can be obtained.

Thus, according to the present technique, the downscaling processing of the spatial and/or temporal resolution is applied to the encoded image data based on the auxiliary information inserted into the video stream, and the display image data having the desired resolution can be obtained. Therefore, a load of the downscaling processing can be reduced.

Meanwhile, according to the present technique, for example, the receiving unit may receive a container in the predetermined format including the video stream, the downscaling information indicating the available ratio in downscaling the spatial and/or temporal resolution may be inserted into the layer of the container, and the processing unit may control the downscaling processing in order to obtain the display image data based on the downscaling information.

Further, according to the present technique, for example, the receiving unit may receive the container in the predetermined format including the video stream, the spatial and/or temporal resolution information of the image data included in the video stream may be inserted into the layer of the container, and the processing unit may control the downscaling processing to obtain the display image data based on the resolution information.

Effects of the Invention

According to the present technique, in the case where image data of super-high definition service is transmitted without scalable coding, image data having a resolution suitable to own display capability can be easily obtained in a receiver not supporting super-high definition service.

BRIEF DESCRIPTION OF DRAWINGS

FIG. 1 is a block diagram illustrating an exemplary configuration of an image transmitting and receiving system as an embodiment.

FIGS. 2(a) to 2(c) are explanatory diagrams for downscaling processing of a spatial resolution.

FIGS. 10(a) and 10(b) are diagrams illustrating exemplary structures (Syntax) of the SEI message (downscaling_spatial SEI message) each including information indicating a limit of accuracy for the motion vector MV as the auxiliary information.

FIG. 11 is a diagram illustrating contents of main information in the exemplary structure of the SEI message (downscaling_spatial SEI message).

FIGS. 12(a) and 12(b) are diagrams illustrating exemplary structures (Syntax) of an SEI message (picture_temporal_pickup SEI message each including information indicating a picture to be selected at the time of downscaling the temporal resolution at a predetermined ratio as the auxiliary information.

FIG. 13 is a diagram illustrating contents of main information in the exemplary structure of the SEI message (picture_temporal_pickup SEI message).

FIG. 14 is a diagram illustrating an exemplary structure (Syntax) of a downscaling descriptor (downscaling_descriptor).

FIG. 15 is a diagram illustrating a modified example of the structure (Syntax) of the downscaling descriptor (downscaling_descriptor).

FIG. 16 is a diagram illustrating contents of main information in the exemplary structure of the downscaling descriptor (downscaling_descriptor).

FIG. 17 is a diagram illustrating an exemplary structure (Syntax) of super high resolution descriptor.

FIG. 18 is a diagram illustrating contents of main information in the exemplary structure of the super high resolution descriptor.

MODE FOR CARRYING OUT THE INVENTION

Figure 3:
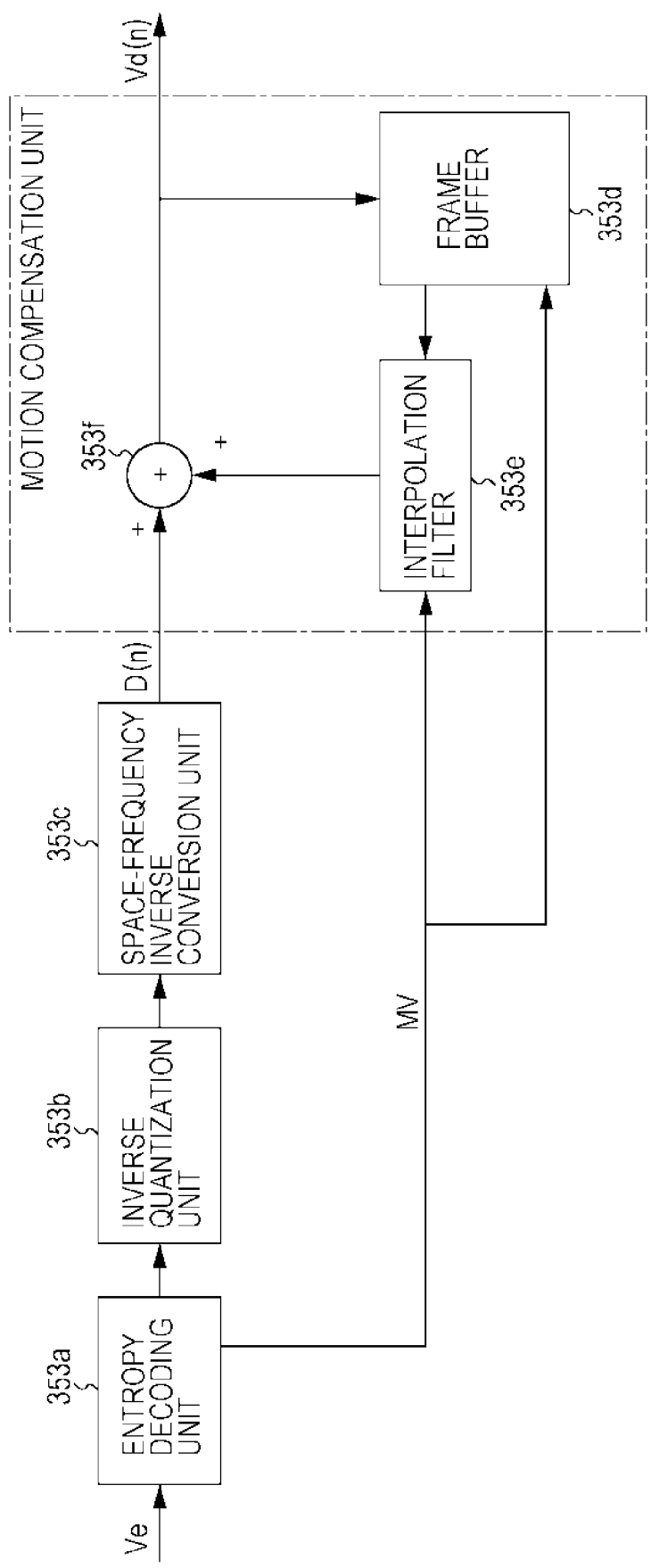
FIG. 3 is a block diagram illustrating an exemplary configuration of a decoder of a receiver.

In the following, a mode for carrying out the invention (hereinafter referred to as "embodiment") will be described. Note that a description will be provided in the following order.
1. Embodiment
2. Modified example 1. Embodiment

[Image Transmitting and Receiving System]

FIG. 1 is a diagram illustrating an exemplary configuration of an image transmitting and receiving system 10 as an embodiment. The image transmitting and receiving system 10 includes a broadcasting station 100 and a receiver 200. The broadcasting station 100 transmits a transport stream TS as a container through a broadcast wave.

The transport stream TS has a video stream including encoded image data. Transmission image data includes data corresponding to various kinds of imaging services. Examples of the imaging services may include, in addition to a service for a high definition (HD) image having valid pixels of 1920×1080, a service for a spatial super-high-resolution image such as 4K and 8K images respectively having two times and four times the valid pixels in horizontal and vertical directions (super-high definition service). Further, the examples of imaging services may include, in addition to an imaging service for an image having the frame frequency of 30 Hz, a service for a temporal super-high-resolution image having a frame frequency of such as 60 Hz and 120 Hz (super-high definition service).

With respect to image data of the super-high definition service, there are cases where: the image data is transmitted after scalable coding is applied; and the image data is transmitted without scalable coding. Backward compatibility is guaranteed by applying scalable coding to the image data, and the image data having a resolution suitable to own display capability can be easily obtained even in a receiver not supporting the super-high definition service.

In the case of transmitting the image data of the super-high definition service, auxiliary information for downscaling the spatial and/or temporal resolution of the image data is inserted into a video stream. The auxiliary information is inserted into a user data area of a picture header or a sequence header of the video stream, for example.

For example, the auxiliary information for downscaling the spatial resolution indicates a limit of accuracy for a motion vector included in the encoded image data. For example, when the limit of accuracy for a normal motion vector is ¼ pixel accuracy, the limit of accuracy for the motion vector is changed to, for example, ½ pixel accuracy or 1 pixel accuracy in order to reduce a processing load for downscaling the spatial resolution on a receiver side.

Also, the auxiliary information for downscaling the temporal resolution identifies a picture to be selected at the time of downscaling the temporal resolution at the predetermined ratio. For example, a picture to be selected at the time of downscaling the resolution at the ratio of ½ corresponds to every other picture (frame) is indicated by this information. Further, for example, the picture to be selected at the time of downscaling the resolution at the ratio of ¼ corresponds every four pictures (frames) is indicated by this information.

By inserting the auxiliary information as described above, the image data having the resolution suitable to the own display capability can be easily obtained in the receiver not supporting the super-high definition service in the case where the image data of the super-high definition service is transmitted without scalable coding. The details of the auxiliary information will be described later.

Further, the identifying information indicating that the auxiliary information is inserted into the video stream is inserted into a layer of the transport stream TS. For example, the identifying information is inserted under a video elementary loop (Video ES loop) of a program map table (PMT: Program Map Table) included in the transport stream TS. This identifying information enables the receiving side to find that the auxiliary information is inserted into the video stream although without decoding the video stream, and the auxiliary information can be appropriately extracted.

There may be a case where the above downscaling information is added with spatial and/or temporal resolution information of the image data included in the video stream. In this case, the receiving side can grasp the spatial and/or temporal resolution of the image data without decoding the video stream. The details of the downscaling information will be described later.

Further, the identifying information is inserted into the layer of the transport stream TS such that the super-high definition service by the video stream can be identified at least per program basis. For example, according to the present embodiment, the spatial and/or temporal resolution information of the image data included in the video stream is inserted into the layer of the transport stream TS. For example, the resolution information is inserted under an event information table (EIT: Event Information Table) included in the transport stream TS. By the resolution information (identifying information), the spatial and/or temporal resolution of the image data can be grasped without decoding the video stream.

The resolution information is added with identifying information identifying whether the video stream is provided with support for a low performance decoder not supporting the spatial and/or temporal resolution of the image data. In this case, the receiving side can easily determine whether the video stream is provided with support for the low performance decoder, more specifically, whether the auxiliary information for downscaling the spatial and/or temporal resolution is inserted or the like. The details of the resolution information will be described later.

The receiver 200 receives the transport stream TS transmitted from the broadcasting station 100 through the broadcast wave. The transport stream TS has the video stream including the encoded image data. The receiver 200 executes decoding processing for the video stream and obtains display image data.

In the case where the image data of the super-high definition service is transmitted without scalable coding and the own display capability does not support the super-high definition service, the receiver 200 applies the downscaling processing of the spatial and/or temporal resolution to the encoded image data based on the auxiliary information, and obtains the display image data having a desired resolution. In this case, the downscaling processing is controlled by a resolution of received image data and an available ratio of downscaling.

For example, there may be a case where the display image data having the desired resolution cannot be obtained depending on the resolution of the received image data and the available ratio of downscaling, but in such a case, the downscaling processing is not executed. Further, in the case where there are plural available ratios of downscaling, the display image data having the desired resolution is obtained by selecting a downscaling ratio in accordance with the resolution of the received image data.

[Downscaling Processing of Resolution]

The downscaling processing executed at the receiver 200 will be described. First, the downscaling processing of a spatial resolution will be described. For example, consideration is given to a case where the received image data is image data of an 8K image as illustrated in FIG. 2(a). More specifically, the downscaling processing to reduce the spatial resolution to ½ in horizontal and vertical directions is applied at the receiver 200 which has display capability for a 4K image, and the image data of the 4K image can be obtained as illustrated in FIG. 2(b). Also, for example, the downscaling processing to reduce the spatial resolution to ¼ in horizontal and vertical directions is applied at the receiver 200 which has the display capability for HD image, and the image data of HD image can be obtained as illustrated in FIG. 2(c).

FIG. 3 is a diagram illustrating an exemplary configuration of a decoder of the receiver 200. Entropy decoding processing is applied to received encoded image data Ve at an entropy decoding unit 353a, and inverse quantization processing is applied at an inverse quantization unit 353b. Further, space-frequency inverse conversion processing is applied at a space-frequency inverse conversion unit 353c to the data applied with the inverse quantization processing, and data D(n) is obtained.

Figure 4:
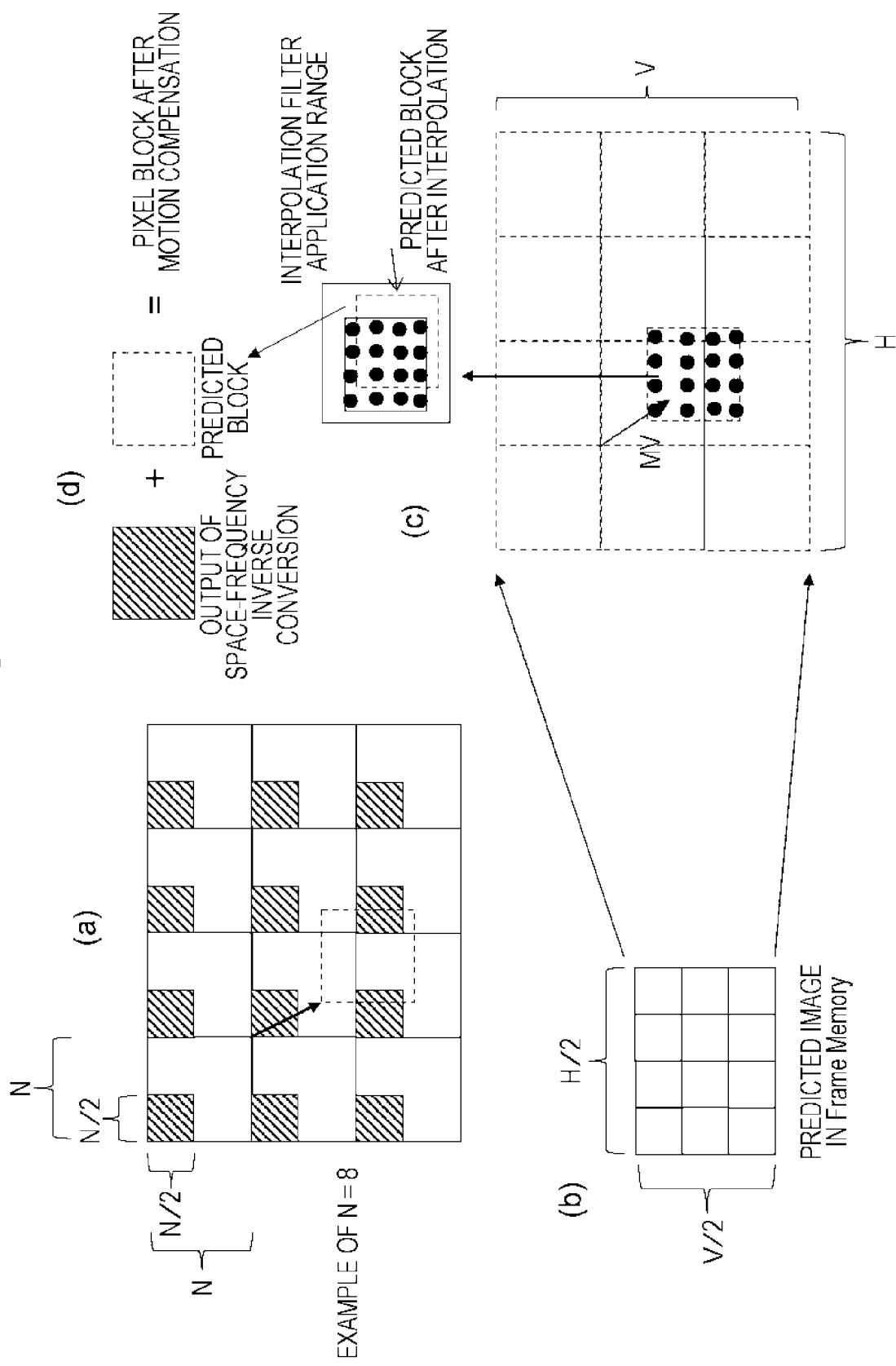
FIGS. 4(a) to 4(d) are explanatory diagrams for the downscaling processing of the spatial resolution.

In this case, the space-frequency inverse conversion processing is applied only to a frequency component in an area corresponding to the downscaling ratio per N*N encoded block (see a hatching area in FIG. 4(a), and downscaled image data is obtained as the data D(n). Note that the example in FIG. 4 is the case where the downscaling ratio is ½.

Pixel data in an area corresponding to a motion vector MV is read out from image data in a previous frame recorded in a frame buffer 353d per encoded block (see FIG. 4(b), and supplied to an interpolation filter 353e and interpolation arithmetic operation is executed to generate a predicted block after interpolation (see FIG. 4(c)). Further, in an adder 353f, the predicted block after interpolation generated at the interpolation filter 353e is added to the data D(n) (see FIG. 4(d)), and downscaled image data Vd(n) in a current frame can be obtained.

Here, pixel accuracy for the motion vector MV added to the encoded image data Ve is defined as P. For example, in the case of executing reduction decoding to ½ at the space-frequency inverse conversion unit 353c, the pixel accuracy becomes rougher, namely, ½, compared to the original accuracy P. In order to execute motion compensation with the pixel accuracy P for the original motion vector MV, the image data at the frame buffer 353d is needed to be interpolated so as to conform to the pixel accuracy P.

For example, in the case where the original motion vector MV is encoded with ¼ pixel accuracy, the accuracy at the time of applying the motion compensation to the image data that has been applied with reduction decoding and stored in the frame buffer 353d is reduced to ½ pixel accuracy of the image data. Therefore, the image data in the frame buffer 353d is needed to be interpolated to $1/(¼*½)$ in order to execute the motion compensation with the accuracy of the original motion vector MV.

Therefore, in the case where there is no limit provided for the accuracy of the motion vector MV, a range of a predicted pixel to be a target of the arithmetic operation of the interpolation filter becomes large and the number of taps of the interpolation filter is increased. As a result, a load of the arithmetic operation is increased. In contrast, in the case where there is a limit provided for the accuracy of the motion vector MV, the range of the predicted pixel to be the target of the arithmetic operation of the interpolation filter becomes small and the number of taps of the interpolation filter is reduced. As a result, the load of the arithmetic operation is reduced.

Figure 5:
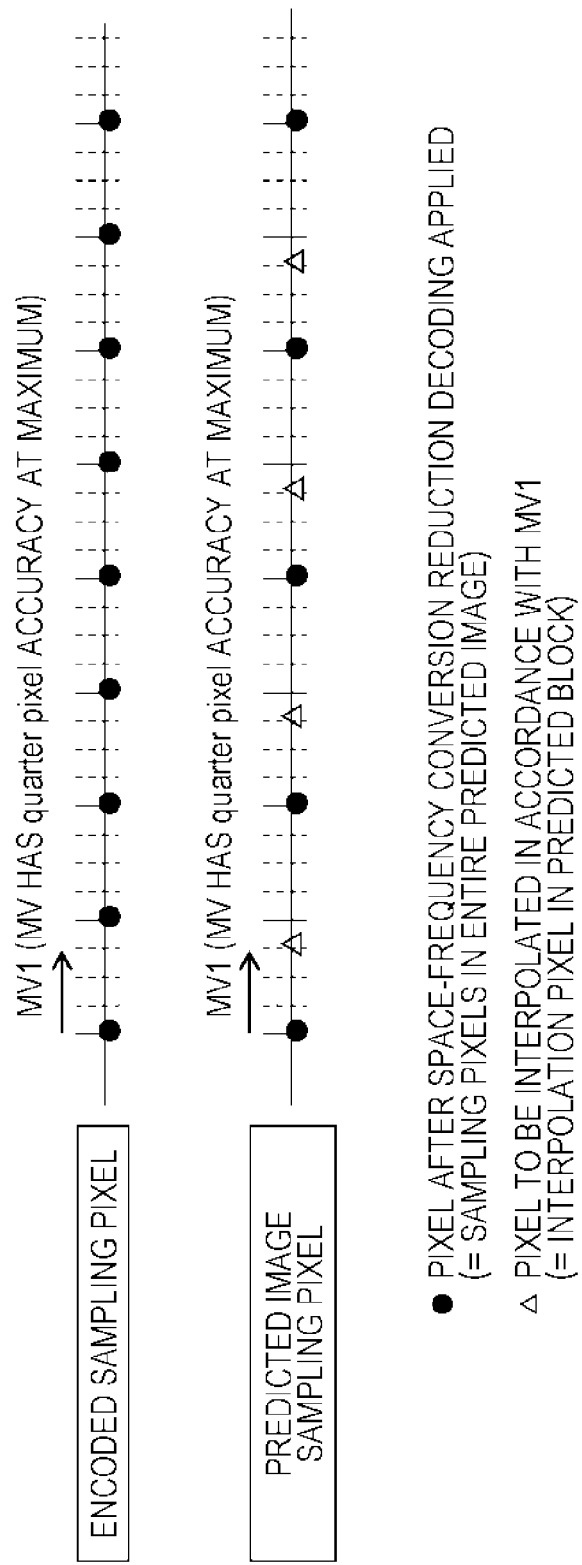
FIG. 5 is an explanatory diagram for a case where there is no limit provided for accuracy of a motion vector MV, for example, in the case where accuracy of a motion vector MV1 is ¼-pixel (quarter pixel) accuracy.

FIG. 5 is a diagram illustrating a case where there is no limit provided for the accuracy of the motion vector MV, more specifically, the case where the accuracy of the motion vector MV1 is ¼-pixel (quarter pixel) accuracy. In this case, the filter arithmetic operation corresponding to the number of phases enough to cover the accuracy of the MV1 is needed to be executed in order to obtain an interpolation pixel from among adjacent predicted pixels. In the case of executing the interpolation arithmetic operation by using a low-pass filter, the number of filter taps of the interpolation filter is increased and accordingly the number of predicted pixels to be the targets is increased in order to secure a passband higher than a certain level and make a vicinity of cutoff frequency steep.

Figure 6:
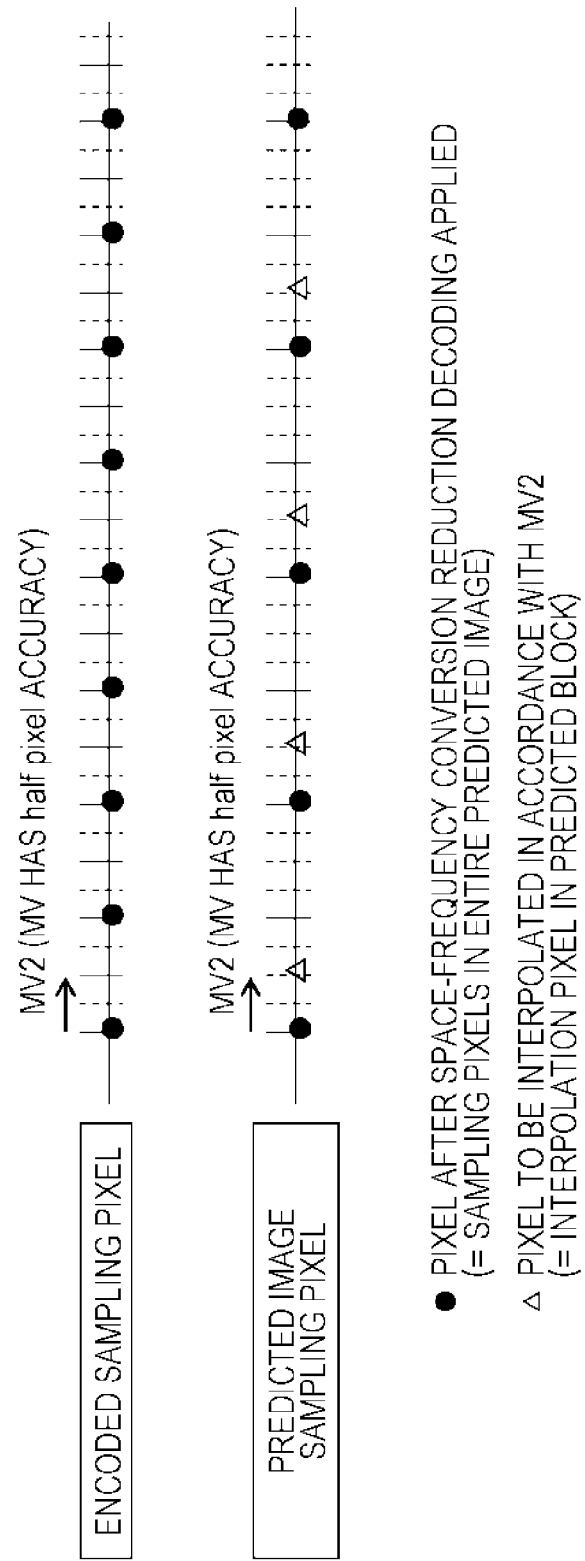
FIG. 6 is an explanatory diagram for a case where there is a limit provided to the accuracy of the motion vector MV, for example, the case where a motion vector MV2 is provided with ½-pixel (half pixel) accuracy.

FIG. 6 is a diagram illustrating a case where there is the limit provided for the accuracy of the motion vector MV, more specifically, the case where accuracy of a motion vector MV2 is ½-pixel (half pixel) accuracy. In this case, the filter arithmetic operation corresponding to the number of phases enough to cover the accuracy of the MV2 is needed to be executed in order to obtain the interpolation pixel from among the adjacent predicted pixels. Since the accuracy of the MV2 is rougher than the accuracy of the MV1, the number of phases becomes reduced. In this case, compared to the above case where no limit is provided, the less number of taps of the interpolation filter and the less number of predicted pixels to be the targets are needed in order to secure equivalent passing.

Judging from this, according to the present embodiment, encoding is executed by suitably providing the limit of accuracy for the motion vector MV in a transmitting side, like the above-described motion vector MV2. In this case, according to the present embodiment, information related to the limit of accuracy for the motion vector MV in inserted into the video stream as the auxiliary information. The receiver 200 recognizes the limit of accuracy of the motion vector MV from the auxiliary information at the time of executing the downscaling processing of the spatial resolution, and can perform the interpolation processing conforming to the limit of accuracy. As a result, the processing load can be reduced.

Figure 7:
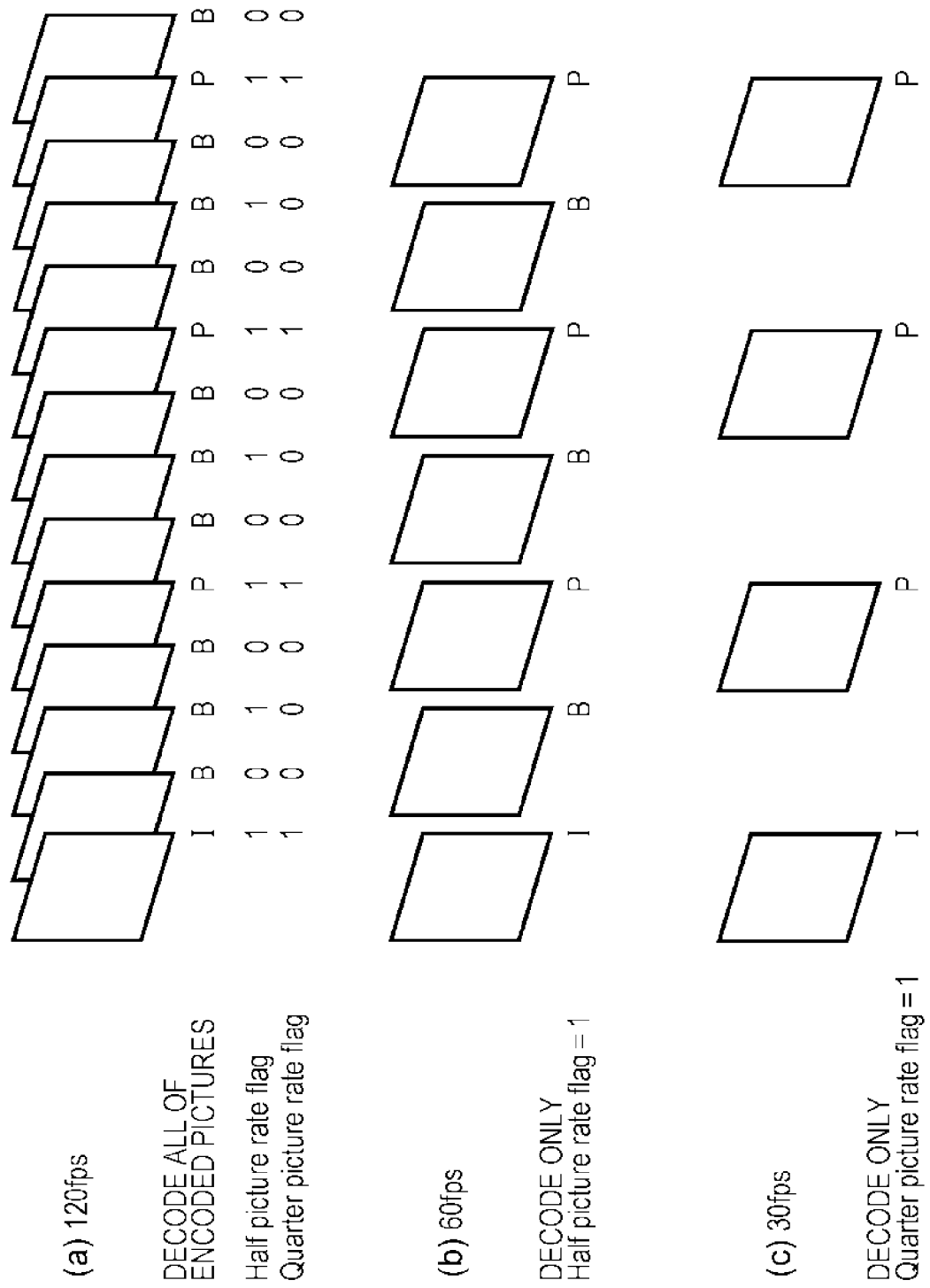
FIGS. 7(a) to 7(c) are explanatory diagrams for the downscaling processing of a temporal resolution.

Next, the downscaling processing of the temporal resolution will be described. For example, consideration is given to a case where the received image data is image data of 120 fps as illustrated in FIG. 7(a). A half picture rate flag and a quarter picture rate flag are inserted into a video stream as the auxiliary information.

The half picture rate flag is "1" at every other picture (frame). In other words, the picture to be selected can be identified by the half picture rate flag at the time of downscaling the temporal resolution to ½. Further, the quarter picture rate flag is "1" at every three pictures (frames). In other words, the picture to be selected can be identified by the quarter picture rate flag at the time of downscaling the temporal resolution to ¼.

For example, in the receiver 200 having the display capability for an image of 60 fps, only every other picture is picked out and decoded to obtain the image data of the image of 60 fps based on the half picture rate flag as illustrated in FIG. 7(b). Further, for example, in the receiver 200 having the display capability for an image of 30 fps, every four pictures is picked out and decoded to obtain the image data of the image of 30 fps based on the quarter picture rate flag as illustrated in FIG. 7(c).

[Exemplary Configuration of Transmitting Data Generation Unit]

Figure 8:
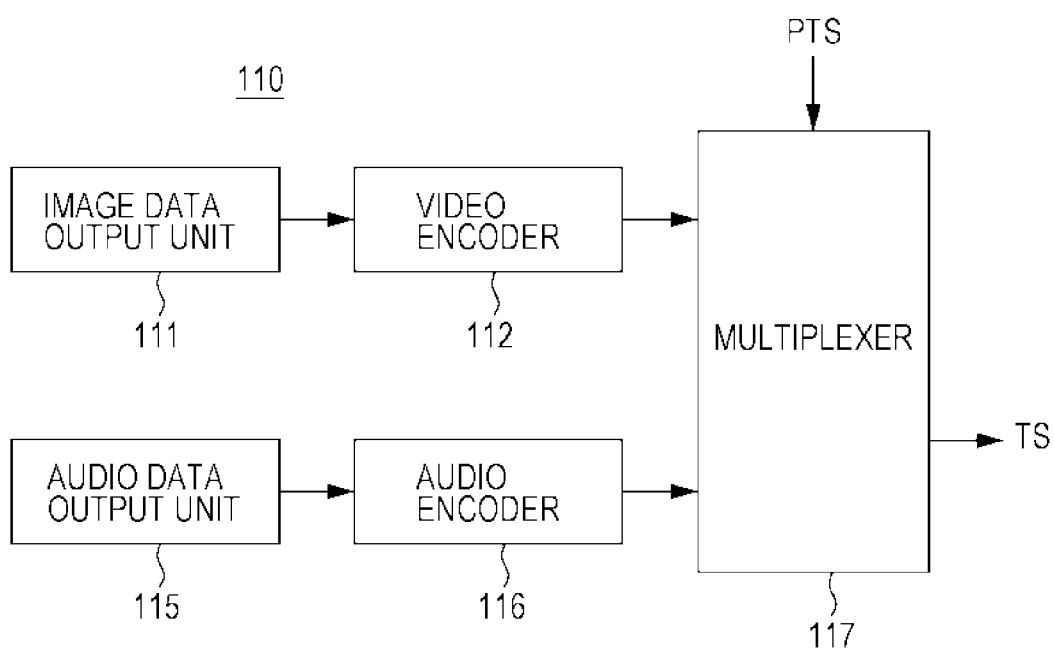
FIG. 8 is a block diagram illustrating an exemplary configuration of a transmitting data generation unit configured to generate a transport stream TS.

FIG. 8 is an exemplary configuration of a transmitting data generation unit 110 configured to generate the above-described transport stream TS in the broadcasting station 100. The transmitting data generation unit 110 includes an image data output unit 111, a video encoder 112, an audio data output unit 115, an audio encoder 116, and a multiplexer 117.

The image data output unit 111 outputs image data corresponding to various kinds of imaging services. The examples of the imaging services may include, in addition to the service for a high definition (HD) image having valid pixels of 1920×1080, the service for the spatial super-high-resolution image such as 4K and 8K images respectively having two times and four times the valid pixels in horizontal and vertical directions (super-high definition service). Further, the examples of imaging services may include, in addition to the imaging service for the image having the frame frequency of 30 Hz, the service for the temporal super-high-resolution image having the frame frequency of such as 60 Hz and 120 Hz (super-high definition service). The image data output unit 111 is formed of, for example, a camera configured to capture an image of an object and output image data thereof, or an image data reading unit configured to read image data from a storage medium and output image data thereof.

The video encoder 112 applies encoding, such as MPEG4-AVC (MVC), MPEG2 video, or HEVC, to the image data output from the image data output unit 111, and obtains encoded image data. Further, the video encoder 112 generates a video stream (video elementary stream) including the encoded image data by a stream formatter (not illustrated) disposed at a later stage.

In this case, for example, there may be a case where image data of the super-high definition service is applied with scalable coding in order to guarantee backward compatibility while there also may be a case where the image data is not applied with scalable coding. In the case where the image data is not applied with scalable coding, the video encoder 112 inserts, into the video stream, the auxiliary information for downscaling the spatial and/or temporal resolution for convenience of the receiver not supporting the super-high definition service.

The audio data output unit 115 outputs audio data corresponding to the image data. The audio data output unit 115 is formed of, for example, a microphone or an audio data reading unit configured to read out audio data from a storage medium and output the audio data. The audio encoder 116 applies encoding, such as MPEG-2 Audio and AAC, to the audio data output from the audio data output unit 115, and generates an audio stream (audio elementary stream).

The multiplexer 117 packetizes and multiplexes each of the elementary streams generated at the video encoder 112, a graphics encoder 114 and the audio encoder 116, and generates a transport stream TS. In this case, a PTS (Presentation Time Stamp) is inserted into a header of each PES (Packetized Elementary Stream) for synchronous reproduction on the receiving side.

The multiplexer 117 inserts, into a layer of the transport stream TS, the downscaling information indicating the spatial and/or temporal downscaling at an available ratio in the case where the image data of the super-high definition service is transmitted without scalable coding. More specifically, the downscaling information is inserted under the video elementary loop (Video ES loop) of the program map table (PMT: Program Map Table) included in the transport stream TS.

Additionally, the multiplexer 117 inserts the identifying information into the layer of the transport stream TS such that the super-high definition service by the video stream can be identified at least per program basis. For example, according to the present embodiment, the multiplexer 117 inserts, into the layer of the transport stream TS, the spatial and/or temporal resolution information of the image data included in the video stream. More specifically, the resolution information is inserted under the event information table (EIT: Event Information Table) included in the transport stream TS.

Operation of the transmitting data generation unit 110 illustrated in FIG. 8 will be briefly described. The image data corresponding to the various kinds of image services output from the image data output unit 111 is supplied to the video encoder 112. In the video encoder 112, encoding such as MPEG4-AVC (MVC), MPEG2 video, or HEVC is applied to the image data, and the video stream (video elementary stream) including the encoded image data is generated. The video stream is supplied to the multiplexer 117.

In this case, for example, there may be a case where image data of the super-high definition service is applied with scalable coding in order to guarantee backward compatibility while there also may be a case where the image data is not applied with scalable coding. In the video encoder 112, in the case where scalable coding is not applied, the auxiliary information for downscaling the spatial and/or temporal resolution is inserted into the video stream for convenience of the receiver not supporting the super-high definition service.

The audio data corresponding to the image data and output from the audio data output unit 115 is supplied to the audio encoder 116. In the audio encoder 116, encoding such as MPEG-2 Audio and AAC is applied to the audio data, and the audio stream (audio elementary stream) is generated. The audio stream is supplied to the multiplexer 117.

In the multiplexer 117, the elementary stream supplied from each encoder is packetized and multiplexed, and the transport stream TS is generated. In this case, the PTS is inserted into the header of each PES for synchronous reproduction on the receiving side. Further, in the multiplexer 117, the downscaling information indicating the spatial and/or temporal downscaling at the available ratio is inserted under the video elementary loop (Video ES loop) of the PMT. Furthermore, in the multiplexer 117, the spatial and/or temporal resolution information of the image data included in the video stream is inserted under the resolution EIT.

[Configurations of Auxiliary Information, Identifying Information, and Resolution Information, and TS Structure]

As described above, the auxiliary information for downscaling the spatial and/or temporal resolution of the image data is inserted into the video stream. For example, in the case where an encoding method is MPEG4-AVC or in the case of an encoding type in which a coding structure of an NAL packet or the like is similar such as HEVC, the auxiliary information is inserted into an "SEIs" section of an access unit (AU) as an SEI message.

Figure 9:
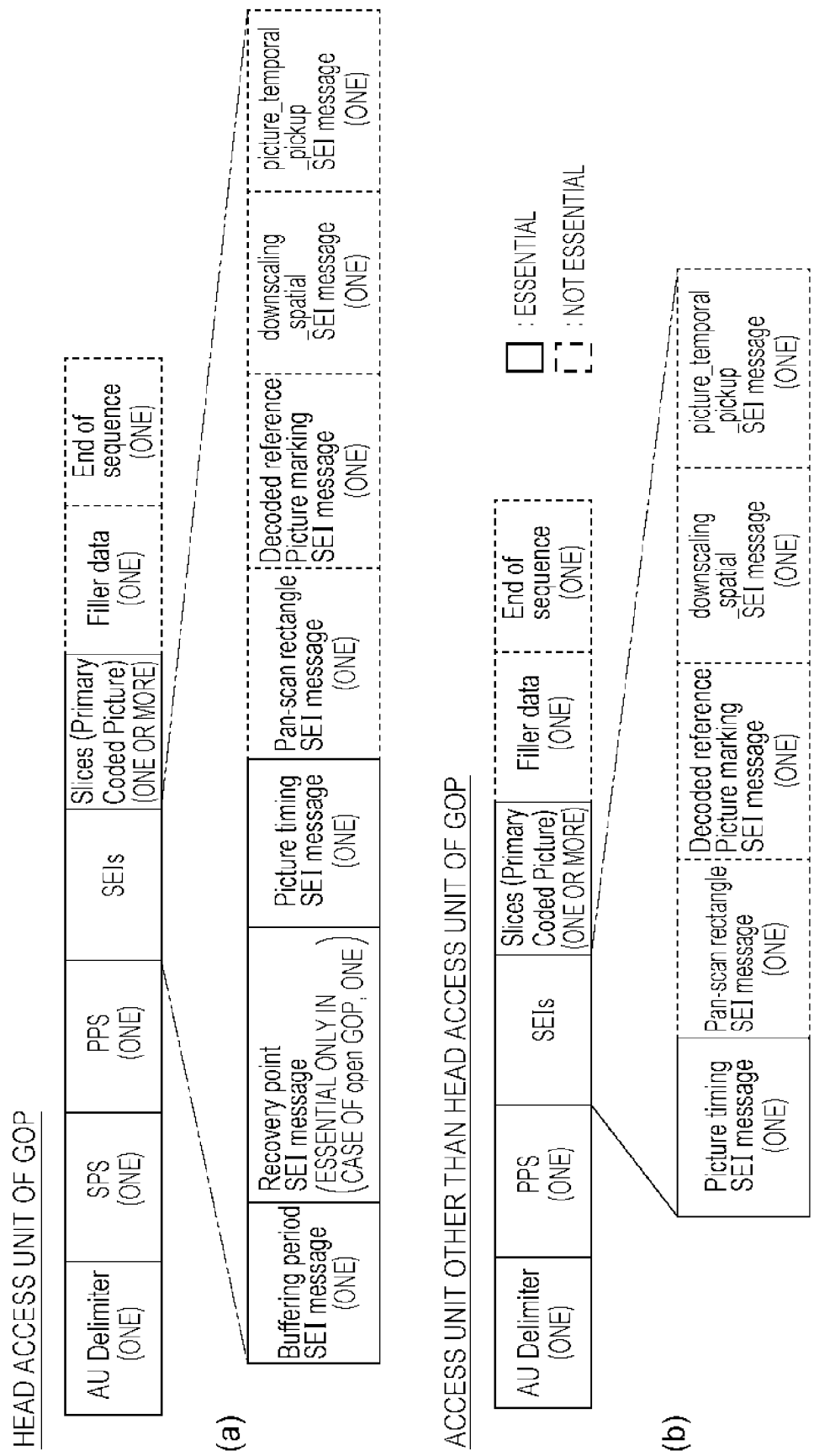
FIGS. 9(a) to 9(b) are diagrams illustrating a head access unit of a GOP into which an SEI message is inserted as auxiliary information, and an access unit other than the head access unit.

In this case, the information as the auxiliary information indicating the limit of accuracy for the motion vector MV is inserted as an SEI message (downscaling_spatial SEI message). Further, the information as the auxiliary information indicating the picture to be selected at the time of downscaling the temporal resolution at the predetermined ratio is inserted as an SEI message (picture_temporal_pickup SEI message). FIG. 9 (a) is a diagram illustrating a head access unit of a GOP (Group Of Picture), and FIG. 9(b) is a diagram illustrating an access unit other than the head access unit of the GOP. The SEI message is encoded at an earlier position on a bit stream than slices where the pixel data is encoded, and therefore, the receiver identifies the SEI contents, thereby achieving to determine subsequent decoding processing.

FIG. 10(a) is a diagram illustrating an exemplary structure (Syntax) of the "downscaling_spatial SEI message". "uuid_iso_iec_11578" has an UUID value specified in "ISO/IEC 11578:1996 Annex A.". In a field of "user_data_payload_byte", "userdata_for_downscaling_spatial( )" is inserted. FIG. 10(b) is a diagram illustrating an exemplary structure (Syntax) of the "userdata_for_downscaling_spatial( )". A flag of "constrained_to_half_pixel_MV_flag" and a flag of "constrained_to_integer_pixel_MV_flag" are included in this structure. "userdata_id" is an identifier represented by unsigned 16 bits.

When the flag "constrained_to_half_pixel_MV_flag" is "1" as illustrated in FIG. 11, it is indicated that the accuracy of the motion vector MV is limited to ½ pixel accuracy. Further, when the "constrained_to_integer_pixel_MV_flag" is "1" as illustrated in FIG. 11, it is indicated that the accuracy of the motion vector MV is limited to integer pixel accuracy.

FIG. 12(a) is an exemplary structure (Syntax) of the "picture_temporal_pickup SEI message". The "uuid_iso_iec_11578" includes the UUID value specified in "ISO/IEC 11578:1996 Annex A.". In the field of "user_data_payload_byte", the "userdata_for_picture_temporal( )" is inserted. FIG. 12(b) is an exemplary structure (Syntax) of the "userdata_for_picture_temporal( )". A flag of the "half picture rate flag" and a flag of the "quarter picture rate flag" are included in this structure. The "userdata_id" is an identifier represented by unsigned 16 bits.

When the flag of "half picture rate flag" is "1" as illustrated in FIG. 13, it is indicated that a picture is to be picked out and decoded by a decoder having the display capability for a ½ temporal resolution. Further, when the flag of "quarter picture rate flag" is "1" as illustrated in FIG. 13, it is indicated that a picture is to be picked out and decoded by a decoder having the display capability for a ¼ temporal resolution.

Additionally, as described above, for example, the identifying information indicating that the auxiliary information for downscaling the above-described spatial and/or temporal resolution of the image data is inserted into the video stream under the video elementary loop (Video ES loop) of the program map table (PMT) in the transport stream TS.

FIG. 14 is a diagram illustrating an exemplary structure (Syntax) of downscaling descriptor (downscaling_descriptor) as the identifying information. Further, FIG. 15 is a diagram illustrating a modified example of the structure (Syntax) of the downscaling descriptor (downscaling_descriptor). FIG. 16 is a diagram illustrating contents of main information (Semantics) in these exemplary structures.

An 8-bit field of "downscaling_descriptor_tag" indicates a descriptor type, and here indicates the downscaling_descriptor. An 8-bit field of "downscaling_descriptor_length" indicates a length (size) of the descriptor and indicates the number of subsequent bytes as the length of the descriptor.

A 2-bit field of "downscaling_type" indicates a downscaling type. For example, "01" indicates the temporal resolution downscaling, "10" indicates the spatial resolution downscaling, and "11" indicates the temporal and spatial resolution downscaling.

When the "downscaling_type" is "01" and "11", the 2-bit field of "temporal_downscaling_factor" becomes effective. The 2-bit field indicates an available ratio (downscale) in downscaling the temporal resolution. For example, "00" indicates that downscaling cannot be executed. Further, "01" indicates that downscaling at the ratio of ½ can be executed. "10" indicates that downscaling at the ratio of ¼ can be executed, and also indicates that downscaling at the ratio of ½ can be also executed. Additionally, when "temporal_downscaling_factor" is "01" and "10", it is also indicated that the auxiliary information for downscaling the temporal resolution is inserted into the video stream.

Further, when the "downscaling_type" is "10" and "11", a 2-bit field of "spatial_downscaling_factor" becomes effective. The 2-bit field indicates the available ratio (downscale) in downscaling the spatial resolution. For example, "00" indicates that downscaling cannot be executed. Further, "01" indicates that downscaling can be executed horizontally and vertically at the ratio of ½. "10" indicates that downscaling can be executed horizontally and vertically at the ratio of ¼ and also indicates that downscaling can be executed at the ratio of ½. Additionally, when the "spatial_downscaling_factor" is "01" and "10", it is indicated that the auxiliary information for downscaling the spatial resolution is inserted into the video stream.

A 3-bit field of "spatial resolution class type" indicates a class type of the spatial resolution of the transmission image data. For example, "001" indicates 1920×1080, namely, the HD resolution. Further, for example, "010" indicates 3840×2160, namely, the 4K resolution. Additionally, for example, "011" indicates 7680×4320, namely, 8K resolution.

A 3-bit field of "temporal resolution class type" indicates a class type of the temporal resolution of the transmission image data. For example, "001" indicates 24 Hz, 25 Hz, 29.97 Hz, 30 Hz, etc., "010" indicates 50 Hz, 59.94 Hz, 60 Hz, etc., "011" indicates 100 Hz, 120 Hz, etc., and "100" indicates 200 Hz, 240 Hz, etc.

Further, as described above, for example, the spatial and/or temporal resolution information of the image data included in the video stream is inserted under the event information table (EIT) of the transport stream TS. FIG. 17 is an exemplary structure (Syntax) of a Super High resolution descriptor as the resolution information. Further, FIG. 18 is a diagram illustrating contents of main information (Semantics) in the exemplary structure.

A 3-bit field of the "Spatial resolution class type" indicates a class type of the spatial resolution of the transmission image data. For example, "001" indicates 1920×1080, namely, the HD resolution. Further, for example, "010" indicates 3840×2160, namely, the 4K resolution. Additionally, for example, "011" indicates 7680×4320, namely, the 8K resolution.

A 3-bit field of "Temporal resolution class type" indicates a class type of the temporal resolution of the transmission image data. For example, "001" indicates 24 Hz, 25 Hz, 29.97 Hz, 30 Hz, etc., "010" indicates 50 Hz, 59.94 Hz, 60 Hz, etc., "011" indicates 100 Hz, 120 Hz, etc., and "100" indicates 200 Hz, 240 Hz, etc.

A 2-bit field of "Backward compatible type" indicates whether backward compatibility is guaranteed with respect to the transmission image data. For example, "00" indicates that backward compatibility is not guaranteed. "01" indicates that backward compatibility is guaranteed with respect to the spatial resolution. In this case, the transmission image data is applied with scalable coding with respect to the spatial resolution, for example. "10" indicates that backward compatibility is guaranteed with respect to the temporal resolution. In this case, the transmission image data is applied with scalable coding with respect to the temporal resolution, for example.

The flag information of "lower_capable_decoder_support_flag" indicates whether support is provided for the low performance decoder not supporting the spatial and/or temporal resolution of the transmission image data. For example, "0" indicates that support is not provided. "1" indicates that support is provided. For example, as described above, in the case where the auxiliary information for downscaling the spatial and/or temporal resolution of the image data is inserted into the video stream, the flag information becomes "1".

Figure 19:
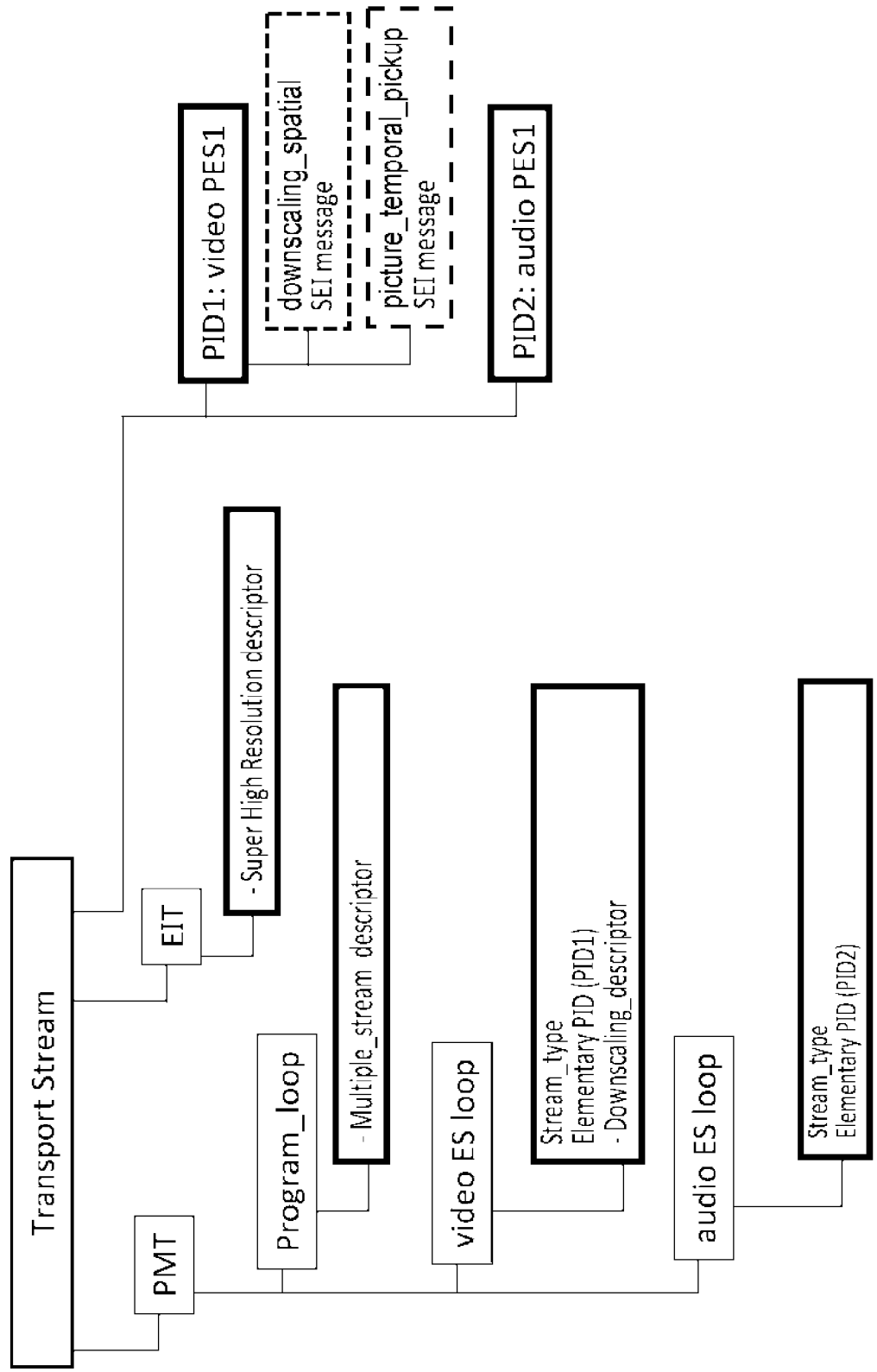
FIG. 19 is a diagram illustrating an exemplary configuration of a transport stream TS.

FIG. 19 is a diagram illustrating an exemplary configuration of the transport stream TS. The transport stream TS includes a PES packet "PID1:video PES1" of the video elementary stream and a PES packet "PID2: Audio PES1" of the audio elementary stream. The auxiliary information for downscaling the spatial and/or temporal resolution of the image data is inserted into the video elementary stream as the SEI message.

In this case, the information as the auxiliary information indicating the limit of accuracy for the motion vector MV is inserted as the SEI message (downscaling_spatial SEI message) (see FIG. 10). Further, the information as the auxiliary information indicating the picture to be selected at the time of downscaling the temporal resolution at the predetermined ratio is inserted as the SEI message (picture_temporal_pickup SEI message) (see FIG. 12).

Further, the transport stream TS includes the PMT (Program Map Table) as the PSI (Program Specific Information). The PSI indicates which program each elementary stream included in the transport stream belongs to. Further, the transport stream TS includes the EIT (Event Information Table) as SI (Serviced Information) to execute control per event (program) basis.

The elementary loop having information related to each elementary stream exists in the PMT. In the exemplary structure, the video elementary loop (Video ES loop) exists. In the video elementary loop, information such as a stream type and a packet identifier (PID) is disposed corresponding to one video elementary stream described above, and also the descriptor describing information related to the video elementary stream thereof is disposed as well.

The downscaling_descriptor (downscaling_descriptor) is inserted under the video elementary loop (Video ES loop) of the PMT (see FIG. 14). The descriptor indicates, as described above, that the auxiliary information for downscaling the spatial and/or temporal resolution of the image data is inserted into the video stream.

Further, the Super High resolution descriptor under the EIT (see FIG. 17). The descriptor forms the identifying information identifying the super-high definition service by the video stream at least per program basis as described above. More specifically, the descriptor includes the spatial and/or temporal resolution information of the transmission image data.

[Exemplary Configuration of Receiver]

Figure 20:
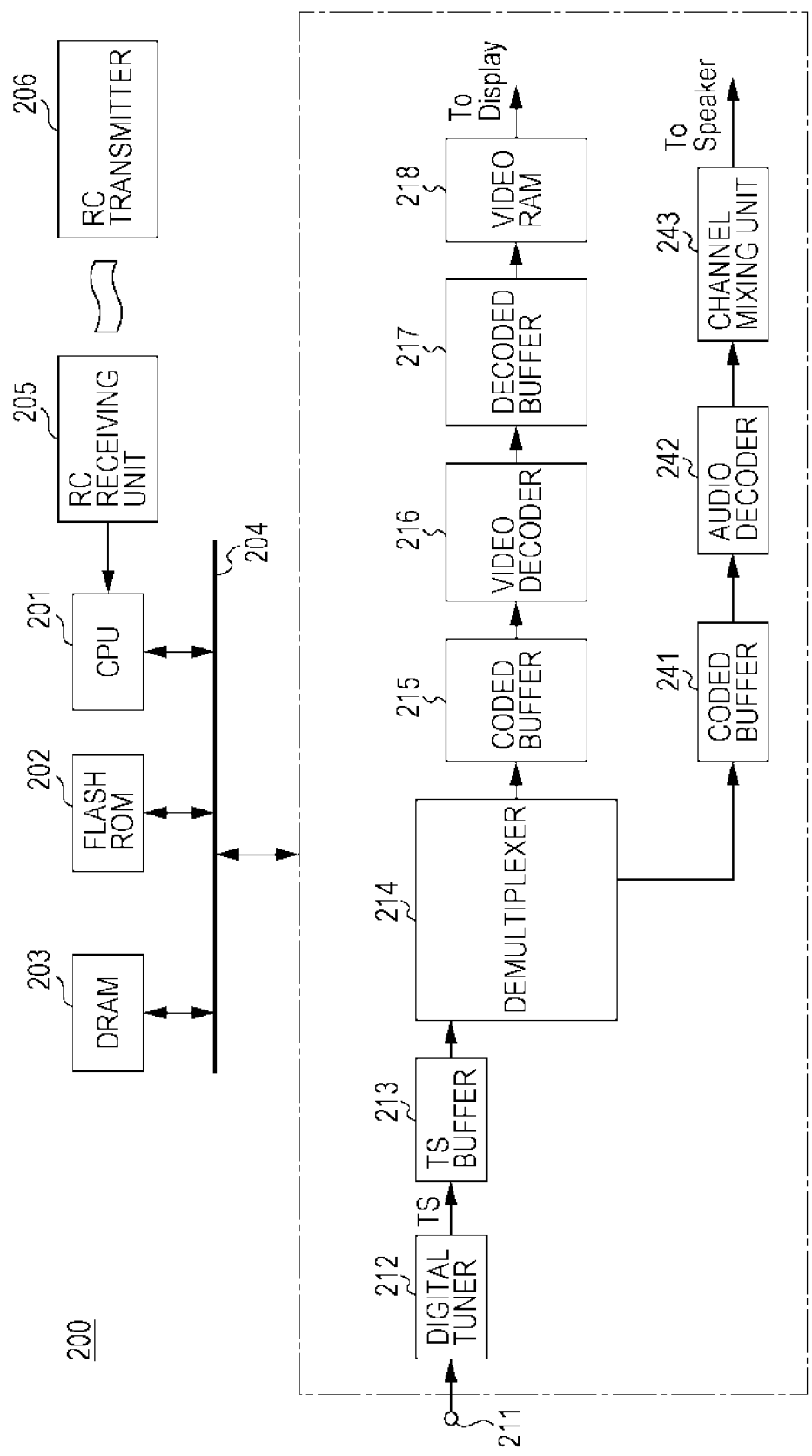
FIG. 20 is a block diagram illustrating an exemplary configuration of the receiver.

FIG. 20 is a diagram illustrating an exemplary configuration of the receiver 200. The receiver 200 includes a CPU 201, a flash ROM 202, a DRAM 203, an internal bus 204, a remote control receiving unit (RC receiving unit) 205, and a remote control transmitter (RC transmitter) 206.

Further, the receiver 200 includes an antenna terminal 211, a digital tuner 212, a transport stream buffer (TS buffer) 213, and a demultiplexer 214. Further, the receiver 200 includes a coded buffer 215, a video decoder 216, a decoded buffer 217, a video RAM 218, a coded buffer 241, an audio decoder 242, and a channel mixing unit 243.

The CPU 201 controls operation of the respective units in the receiver 200. The flash ROM 202 stores control software and maintains data. The DRAM 203 constitutes a work area of the CPU 201. The CPU 201 develops, on the DRAM 203, software and data read from the flash ROM 202 and starts up the software to control the respective units in the receiver 200. The RC transmitter 205 receives a remote control signal (remote control code) transmitted from the RC transmitter 206, and supplies the same to the CPU 201. The CPU 201 controls the respective units in the receiver 200 based on the remote control code. The CPU 201, flash ROM 202, and DRAM 203 are mutually connected via the internal bus 204.

The antenna terminal 211 is a terminal to input a television broadcast signal received by a receiving antenna (not illustrated). The digital tuner 212 processes the television broadcast signal received at the antenna terminal 211, and outputs a predetermined transport stream TS corresponding to a user's selected channel. The transport stream buffer (TS buffer) 213 temporarily stores the transport stream TS output from the digital tuner 212. The transport stream TS includes the video elementary stream and the audio elementary stream.

The demultiplexer 214 extracts each one of the video and audio streams (elementary stream) from the transport stream TS temporarily stored in the TS buffer 213. Further, the demultiplexer 214 extracts the above-described downscaling descriptor (downscaling_descriptor) and Super High resolution descriptor from the transport stream TS and transmits these descriptor to the CPU 201.

The CPU 201 can grasp, from the Super High resolution descriptor, the spatial and temporal resolution information of the received image data, also the information regarding whether the received image data has backward compatibility, and the information regarding whether the received image data is provided with the support for the low performance decoder. Additionally, the CPU 201 can grasp, from the downscaling descriptor, the information regarding whether the auxiliary information for downscaling processing of the spatial and/or temporal resolution is inserted into the video stream and also the information regarding the available ratio in downscaling the spatial and/or temporal resolution.

The CPU 201 controls processing such as decoding in the receiver 200 based on these grasped information. For example, in the case where the image data for the super-high definition service unsupported by the own display capability is received and scalable coding is not applied to the image data, the CPU 201 executes the downscaling processing of the spatial and/or temporal resolution based on the auxiliary information inserted into the video stream and executes control such that display image data having a desired resolution can be obtained.

The coded buffer 215 temporarily stores the video elementary stream extracted at the demultiplexer 214. The video decoder 216 applies the decoding processing to the video stream stored in the coded buffer 215 under control of the CPU 201, and obtains the display image data. Note that there may be a case where downscaling processing of the spatial and/or temporal resolution cannot be executed and the display image data having the resolution suitable to the own display capability cannot be obtained depending on the contents of the received image data.

Further, the video decoder 216 extracts the SEI message inserted into the video stream, and transmits the same to the CPU 201. The SEI message also includes the "downscaling_spatial SEI message" and "picture_temporal_pickup SEI message". In the case where downscaling processing of the spatial and/or temporal resolution is executed at the video decoder 216, the CPU 201 causes the downscaling processing to be executed based on the auxiliary information included in the SEI message.

More specifically, in the case of executing the downscaling processing of the spatial resolution, the downscaling processing is executed based on the information related to the limit of accuracy for the motion vector MV included in the SEI message "downscaling_spatial SEI message", thereby reducing the processing load. On the other hand, in the case of executing the downscaling processing of the temporal resolution, the downscaling processing is executed based on the information related to the selected picture according to the ratio included in the SEI message "picture_temporal_pickup SEI message", thereby reducing the processing load.

The decoded buffer 217 temporarily stores the display image data obtained at the video decoder 216. The video RAM 218 imports the display image data stored in the decoded buffer 217, and outputs the image data to a display at an appropriate timing.

The coded buffer 241 temporarily stores the audio stream extracted at the demultiplexer 214. The audio decoder 242 applies the decoding processing to the audio stream stored in the coded buffer 241 and obtains decoded audio data. With respect to the audio data obtained at the audio decoder 242, the channel mixing unit 243 obtains audio data for each channel in order to implement, for example, 5.1ch sound, and then supplies the audio data to a speaker.

Operation of the receiver 200 will be described. The television broadcast signal received at the antenna terminal 211 is supplied to the digital tuner 212. In the digital tuner 212, the television broadcast signal is processed, and a predetermined transport stream TS corresponding to a channel selected by a user is output. The transport stream TS is temporarily stored at the TS buffer 213. The transport stream TS includes the video elementary stream and the audio elementary stream.

In the demultiplexer 214, each of the video and audio streams (elementary stream) is extracted from the transport stream TS temporarily stored at the TS buffer 213. Further, in the demultiplexer 214, the downscaling descriptor (downscaling_descriptor) and Super High resolution descriptor are extracted from the transport stream TS, and transmitted to the CPU 201. In the CPU 201, the processing such as decoding executed at the receiver 200 is controlled based on the information included in these descriptors.

The video stream extracted at the demultiplexer 214 is supplied to the coded buffer 215 and temporarily stored. In the video decoder 216, the decoding processing is applied to the video stream stored in the coded buffer 215 under control of the CPU 201, and the display image data suitable to the own display capability can be obtained.

In this case, in the video decoder 216, the SEI message including "downscaling_spatial SEI message", "picture_temporal_pickup SEI message", etc. inserted into a basic video stream is extracted and transmitted to the CPU 201. In the CPU 201, in the case where the downscaling processing of the spatial and/or temporal resolution is executed at the video decoder 216, the downscaling processing is executed based on the auxiliary information included in the SEI message.

The display image data obtained at the video decoder 216 is temporarily stored in the decoded buffer 217. After that, in the video RAM 218, the display image data stored in the decoded buffer 217 is imported and then output to the display at the appropriate timing. In this manner, the image is displayed on the display.

Further, the audio stream extracted at the demultiplexer 214 is supplied to the coded buffer 241 and temporarily stored. In the audio decoder 242, the decoding processing is applied to the audio stream stored in the coded buffer 241, and the decoded audio data is obtained. The audio data is supplied to the channel mixing unit 243 In the channel mixing unit 243, for example, the audio data for each channel to achieve 5.1ch sound is generated with respect to the audio data. The audio data is supplied to, for example, the speaker, and audio is output in accordance with the image display.

As described above, according to the image transmitting and receiving system 10 illustrated in FIG. 1, transmission is executed upon inserting the auxiliary information for downscaling the spatial and/or temporal resolution of the image data into the video stream. Therefore, in the case where the image data of the super-high definition service is transmitted without scalable coding, the image data having the resolution suitable to the own display capability can be easily obtained even in the receiver 200 not supporting the super-high definition service.

2. Modified Example

Note that, in the above-described embodiment, the example in which a container is a transport stream (MPEG-2 TS) has been described. However, the present technique is applicable to a system having a configuration in which delivery is carried out to a receiving terminal by utilizing a network such as the Internet. In the case of the Internet delivery, delivery is carried out mostly by the container in the MP4 format or other formats. In other words, the containers in various kinds of formats, such as the transport stream (MPEG-2 TS) adopted in the digital broadcasting standard and the MP4 format used in the Internet delivery are applicable as the container.

Further, the present technique can have the following configurations.

(1) A transmission device including: a transmission unit configured to transmit a container in a predetermined format having a video stream including encoded image data; and an auxiliary information inserting unit configured to insert, into the video stream, auxiliary information for downscaling a spatial and/or temporal resolution of the image data.

(2) The transmission device recited in above (1), wherein the auxiliary information indicates a limit of accuracy for a motion vector included in the encoded image data.

(3) The transmission device recited in above (1) or (2), wherein the auxiliary information identifies a picture to be selected at the time of downscaling a temporal resolution at a predetermined ratio.

(4) The transmission device recited in any of above (1) to (3), further including an identifying information inserting unit configured to insert, into a layer of the container, identifying information indicating that the auxiliary information is inserted into the video stream.

(5) The transmission device recited in above (4), wherein downscaling information indicating an available ratio in downscaling a spatial and/or temporal resolution is added to the identifying information.

(6) The transmission device recited in above (4) or (5), wherein spatial and/or temporal resolution information of image data included in the video stream is added to the identifying information.

(7) The transmission device recited in any of above (4) to (6), wherein the container is a transport stream, and the identifying information inserting unit inserts the identifying information into descriptor under a video elementary loop of a program map table included in the transport stream.

(8) The transmission device recited in any of above (1) to (7), further including a resolution information inserting unit configured to insert, into a layer of the container, the spatial and/or temporal resolution information of the image data included in the video stream.

(9) The transmission device recited in above (8), wherein identifying information identifying whether the video stream is provided with support for a low performance decoder not supporting the spatial and/or temporal resolution of the image data is added to the resolution information.

(10) The transmission device recited in above (8) or (9), wherein the container is a transport stream, and the resolution information inserting unit inserts the resolution information into descriptor under an event information table included in the transport stream.

(11) A transmitting method including steps of: transmitting a container in a predetermined format having a video stream including encoded image data; and inserting, into the video stream, auxiliary information for downscaling a spatial and/or temporal resolution of the image data.

(12) A transmission device including: a transmission unit configured to transmit a container in a predetermined format having a video stream including encoded image data; and an identifying information inserting unit configured to insert, into a layer of the container, identifying information such that a super-high definition service by the video stream can be identified at least per program basis.

(13) The transmission device recited in above (12), wherein the identifying information includes spatial and/or temporal resolution information of the image data.

(14) The transmission device recited in above (12) or (13), wherein support information indicating whether the video stream is provided with support for a low performance decoder not supporting a spatial and/or temporal resolution of the image data is added to the identifying information.

(15) The transmission device recited in any of above (12) to (14), wherein the container is a transport stream, and the identifying information inserting unit inserts the identifying information into descriptor under an event information table included in the transport stream.

(16) A transmitting method including steps of: transmitting a container in a predetermined format having a video stream including image data; and inserting, into a layer of the container, identifying information such that a super-high definition service by the video stream can be identified at least per program basis.

(17) A reception device including: a receiving unit configured to receive a video stream including encoded image data; and a processing unit configured to apply downscaling processing of a spatial and/or temporal resolution to the encoded image data based on auxiliary information for downscaling the spatial and/or temporal resolution of the image data, and obtain display image data having a desired resolution, wherein the auxiliary information is inserted into the video stream.

(18) The reception device recited in above (17), wherein the receiving unit receives a container in a predetermined format including the video stream, downscaling information indicating an available ratio in downscaling the spatial and/or temporal resolution is inserted into a layer of the container, and the processing unit controls the downscaling processing in order to obtain the display image data based on the downscaling information.

(19) The reception device recited in above (17) or (18), wherein the receiving unit receives a container in a predetermined format including the video stream, spatial and/or temporal resolution information of image data included in the video stream is inserted into a layer of the container, and the processing unit controls the downscaling processing to obtain the display image data based on the resolution information.

(20) A receiving method including steps of: receiving a video stream including encoded image data and inserted with auxiliary information for downscaling a spatial and/or temporal resolution of the image data; and applying downscaling processing of a spatial and/or temporal resolution to the encoded image data based on the auxiliary information and obtaining display image data having a desired resolution.

The main characteristic of the present technique is that a load of downscaling processing on the receiving side can be reduced because transmission is executed by inserting, into the video stream, the auxiliary information (SEI message) for downscaling the spatial and/or temporal resolution of the image data (see FIG. 19). Additionally, the main characteristic of the present technique is that the super-high definition service can be identified on the receiving side without decoding the video stream by inserting, into the layer of the container (transport stream), the identifying information such that the super-high definition service by the video stream can be identified at least per program basis (see FIG. 19).

REFERENCE SIGNS LIST

10 Image transmitting and receiving system
100 Broadcasting station
110 Transmitting data generation unit
111 Image data output unit
112 Video encoder
115 Audio data output unit
116 Audio encoder
117 Multiplexer
200 Receiver
201 CPU
212 Digital tuner
213 Transport stream buffer (TS buffer)
214 Demultiplexer
215 Coded buffer
216 Video decoder
217 Decoded buffer
218 Video RAM
241 Coded buffer
242 Audio decoder
243 Channel mixing unit.

The invention claimed is:

1. A reception device, comprising:
a receiver configured to receive a video stream and resolution information, the video stream including encoded image data and auxiliary information for downscaling a spatial resolution and/or a temporal resolution of the encoded image data, and the resolution information indicating whether the video stream is provided with support for a decoder that is not configured to support the spatial resolution or the temporal resolution of the encoded image data; and
processing circuitry configured to, in a case that the resolution information indicates that the video stream is provided with the support for the decoder,
apply downscaling processing of the spatial resolution and/or the temporal resolution to the encoded image data based on the auxiliary information, and
obtain display image data for display based on the downscaling processing.

2. The reception device according to claim 1, wherein the processing circuitry is configured to process the auxiliary information to determine a picture to be selected for downscaling.

3. The reception device according to claim 1, wherein the processing circuitry is configured to process identifying information indicating that auxiliary information is included in the video stream.

4. The reception device according to claim 3 wherein the processing circuitry is configured to process the identifying information for identification on a per program basis.

5. The reception device according to claim 1, wherein the receiver is configured to receive a container including the video stream and the resolution information.

6. The reception device according to claim 5, wherein identifying information is included in a layer of the container, the identifying information indicating that the auxiliary information is included in the video stream.

7. The reception device according to claim 1, wherein
the receiver is configured to receive downscaling information indicating an available ratio in downscaling the spatial resolution and/or the temporal resolution, and
the processing circuitry is configured to control the downscaling processing based on the downscaling information.

8. A receiving method, comprising:
receiving a video stream and resolution information, the video stream including encoded image data and auxiliary information for downscaling a spatial resolution and/or a temporal resolution of the encoded image data, and the resolution information indicating whether the video stream is provided with support for a decoder that is not configured to support the spatial resolution or the temporal resolution of the encoded image data; and
in a case that the resolution information indicates that the video stream is provided with the support for the decoder,
applying downscaling processing of the spatial resolution and/or the temporal resolution to the encoded image data based on the auxiliary information, and
obtaining display image data for display based on the downscaling processing.

9. A transmission device, comprising:
processing circuitry configured to generate a container that includes a video stream and resolution information, the video stream including encoded image data and auxiliary information for downscaling a spatial resolution and/or a temporal resolution of the encoded image data, and the resolution information indicating whether the video stream is provided with support for a decoder that is not configured to support the spatial resolution or the temporal resolution of the encoded image data; and
a transmitter configured to transmit the container.

10. The transmission device according to claim 9, wherein the auxiliary information indicates a limit of accuracy for a motion vector included in the encoded image data.

11. The transmission device according to claim 9, wherein the auxiliary information identifies a picture to be selected at the time of downscaling the temporal resolution at a predetermined ratio.

12. The transmission device according to claim 9, wherein the container further includes identifying information at a layer of the container, the identifying information indicating that the auxiliary information is included in the video stream.

13. The transmission device according to claim 12, wherein the identifying information includes downscaling information indicating an available ratio in downscaling the spatial resolution or the temporal resolution.

14. The transmission device according to claim 12, wherein the identifying information includes the spatial resolution or the temporal resolution of the encoded image data included in the video stream.

15. The transmission device according to claim 12, wherein the container is a transport stream, and the identifying information is included in a descriptor under a video elementary loop of a program map table included in the transport stream.

16. The transmission device according to claim 9, wherein
the container further includes the resolution information at a layer of the container, and
the resolution information further indicates the spatial resolution or the temporal resolution of the encoded image data included in the video stream.

17. The transmission device according to claim 16, wherein the container is a transport stream, and the resolution information is included in a descriptor under an event information table included in the transport stream.

18. A transmitting method, comprising:
generating a container that includes a video stream and resolution information, the video stream including encoded image data and auxiliary information for downscaling a spatial resolution and/or a temporal resolution of the encoded image data, and the resolution information indicating whether the video stream is provided with support for a decoder that is not configured to support the spatial resolution or the temporal resolution of the encoded image data; and transmitting the container.

19. A transmission device, comprising:

processing circuitry configured to generate a container that includes a video stream and resolution information at a layer of the container, the video stream including encoded image data, and the resolution information indicating whether a super-high definition service provided by the video stream is identifiable on per program basis and indicating whether the video stream is provided with support for a decoder that is not configured to support a spatial resolution or a temporal resolution of the encoded image data; and a transmitter configured to transmit the container.

20. The transmission device according to claim 19, wherein the resolution information includes spatial or temporal resolution information of the encoded image data.

21. The transmission device according to claim 19, wherein the container is a transport stream, and the resolution information is included in a descriptor under an event information table included in the transport stream.

22. The reception device according to claim 1, wherein the processing circuitry is configured to process the auxiliary information to determine a limit of accuracy for a motion vector included in the encoded image data.

23. The receiving method according to claim 8, wherein the applying the downscaling processing comprises:
determining a limit of accuracy for a motion vector included in the encoded image data according to the auxiliary information.

24. The receiving method according to claim 8, wherein the applying the downscaling processing comprises:
determining a picture to be selected for downscaling according to the auxiliary information.

* * * * *